(12) United States Patent
Gunter et al.

(10) Patent No.: US 10,786,856 B2
(45) Date of Patent: Sep. 29, 2020

(54) CLEANLINE THREADER

(71) Applicant: Anvil International, LLC, Exeter, NH (US)

(72) Inventors: Larry Keith Gunter, Albertville, AL (US); Steven Douglas Hampton, Albertville, AL (US); Anthony Mack Ford, Crossville, AL (US); James Paul Birkholz, Huntsville, AL (US); Ed Hayes

(73) Assignee: Anvil International, LLC, Exeter, NH (US)

( * ) Notice: Subject to any disclaimer, the term of this patent is extended or adjusted under 35 U.S.C. 154(b) by 0 days.

(21) Appl. No.: 16/043,568

(22) Filed: Jul. 24, 2018

(65) Prior Publication Data

US 2018/0326521 A1 Nov. 15, 2018

Related U.S. Application Data

(62) Division of application No. 15/383,691, filed on Dec. 19, 2016, now abandoned.

(51) Int. Cl.
*B23G 5/18* (2006.01)
*B23G 1/32* (2006.01)
(Continued)

(52) U.S. Cl.
CPC ............. *B23G 5/182* (2013.01); *B23G 1/32* (2013.01); *B23Q 1/626* (2013.01); *G05B 19/186* (2013.01);
(Continued)

(58) Field of Classification Search
CPC ............. Y10T 29/5107; Y10T 29/5168; Y10T 408/8928; Y10T 409/300056;
(Continued)

(56) References Cited

U.S. PATENT DOCUMENTS 1,202,195 A * 10/1916 Lees .................. B23G 5/18
407/24
1,548,730 A * 8/1925 Mirfield ................ B23G 1/32
138/96 R
(Continued)

FOREIGN PATENT DOCUMENTS

DE 3921734 1/1991
DE 102005031561 B3 * 2/2007 ............... B23G 1/32
(Continued)

OTHER PUBLICATIONS

Gunter, Larry Keith; Final Office Action for U.S. Appl. No. 15/383,691, filed Dec. 19, 2016, dated Dec. 19, 2018, 19 pgs.
(Continued)

*Primary Examiner* — Erica E Cadugan
*Assistant Examiner* — Michael Vitale
(74) *Attorney, Agent, or Firm* — Taylor English Duma LLP

(57) ABSTRACT

A method of operating a thread milling machine includes securing a product in a securing mount proximate to the thread milling machine, the thread milling machine having a spindle; securing a combination tool to the spindle, the combination tool having a body and an insert, the body having a first end and a second end, the body defining a securing pocket, the insert secured proximate to the second end at a first side of the securing pocket, the second end attached to the spindle; and rotating the spindle.

14 Claims, 7 Drawing Sheets

(51) Int. Cl.
*G05B 19/18* (2006.01)
*B23Q 1/62* (2006.01)

(52) U.S. Cl.
CPC .... *B23G 2200/10* (2013.01); *B23G 2200/147* (2013.01); *B23G 2210/08* (2013.01); *B23G 2240/60* (2013.01); *Y10T 29/5168* (2015.01); *Y10T 409/300112* (2015.01)

(58) Field of Classification Search
CPC . Y10T 409/300112; B23G 1/32; B23G 5/182; B23G 2200/10; B23G 2200/147; B23G 2200/12; B23G 2200/141; B23G 2210/08; B23G 2240/60
USPC ............... 29/26 A, 50; 408/203; 409/65, 66; 700/187
See application file for complete search history.

(56) References Cited

U.S. PATENT DOCUMENTS

| | | | | |
|---|---|---|---|---|
| 3,346,894 | A * | 10/1967 | Lemelson | B23B 51/08 318/162 |
| 5,465,215 | A * | 11/1995 | Strickland | G05B 19/409 700/180 |
| 5,609,446 | A | 3/1997 | Link et al. | |
| 5,876,158 | A | 3/1999 | Beiter | |
| 5,933,353 | A * | 8/1999 | Abriam | G05B 19/4097 700/171 |
| 6,012,882 | A * | 1/2000 | Turchan | B23G 5/188 408/222 |
| 6,161,995 | A | 12/2000 | Wakazono et al. | |
| 6,293,740 | B1 * | 9/2001 | Schulte | B23G 5/182 409/66 |
| 6,460,435 | B1 * | 10/2002 | Meyer | B23G 1/32 409/66 |
| 7,140,819 | B2 | 11/2006 | Broghammer et al. | |
| 7,214,009 | B2 * | 5/2007 | Quanz | B23B 31/005 408/144 |
| 7,223,221 | B2 * | 5/2007 | Sugata | B23Q 1/626 409/134 |
| 7,707,608 | B2 | 4/2010 | Gordon et al. | |
| 8,038,370 | B2 * | 10/2011 | Sjoo | B23C 5/109 407/29 |
| 8,360,694 | B2 * | 1/2013 | Sjoo | B23B 29/24 407/113 |
| 9,108,259 | B1 * | 8/2015 | Hung | B23G 1/08 |
| 2005/0286894 | A1 | 12/2005 | Duelk | |
| 2006/0233623 | A1 | 10/2006 | Andoh et al. | |
| 2008/0090666 | A1 * | 4/2008 | Frecska | B23G 1/34 470/10 |
| 2008/0131218 | A1 | 6/2008 | Omori et al. | |
| 2009/0162157 | A1 | 6/2009 | Makino et al. | |
| 2010/0171276 | A1 | 7/2010 | Kaneko | |
| 2010/0260568 | A1 * | 10/2010 | Osawa | B23G 5/18 409/74 |
| 2012/0219369 | A1 | 8/2012 | Kress | |
| 2013/0045059 | A1 | 2/2013 | Bozkurt | |
| 2015/0298272 | A1 * | 10/2015 | Murata | B23Q 7/1431 414/222.07 |
| 2016/0019270 | A1 * | 1/2016 | Jones | G06F 16/248 700/98 |
| 2018/0169780 | A1 | 6/2018 | Gunter et al. | |
| 2018/0326522 | A1 | 11/2018 | Gunter et al. | |

FOREIGN PATENT DOCUMENTS

| | | | | |
|---|---|---|---|---|
| EP | 0274027 | | 7/1988 | |
| GB | 110395 | A * | 10/1917 | ............ B23G 1/32 |
| WO | WO-2010101512 | A2 * | 9/2010 | ............ B23G 1/32 |

OTHER PUBLICATIONS

Gunter, Larry Keith; Non-Final Office Action for U.S. Appl. No. 15/383,691, filed Dec. 19, 2016, dated Sep. 5, 2018, 13 pgs.
Gunter, Larry Keith; Requirement for Restriction/Election for U.S. Appl. No. 15/383,691, filed Dec. 19, 2016, dated May 29, 2018, 7 pgs.
Gunter, Larry Keith; Non-Final Office Action for U.S. Appl. No. 16/043,578, filed Jul. 24, 2018, dated Oct. 9, 2019, 32 pgs.
Gunter, Larry Keith; Final Office Action for U.S. Appl. No. 16/043,578, filed Jul. 24, 2018, dated Apr. 9, 2020, 30 pgs.
Gunter, Larry Keith; Non-Final Office Action for U.S. Appl. No. 16/043,578, filed Jul. 24, 2018, dated Jun. 19, 2020, 23 pgs.

* cited by examiner

CLEANLINE THREADER

REFERENCE TO RELATED APPLICATIONS

This application is a divisional of U.S. application Ser. No. 15/383,691, filed Dec. 19, 2016, which is hereby specifically incorporated by reference herein in its entirety.

TECHNICAL FIELD

This disclosure relates to a thread milling system. More specifically, this disclosure relates to a thread milling machine and a combination tool.

BACKGROUND

Threading is a process of creating a screw thread on products such as pipes, fasteners, and various other products where threading is desired. Different ways of making threads include metal cutting, molding, and rolling. The metal cutting method includes various techniques such as thread turning, thread milling, thread tapping, thread whirling, and grinding, among others. Thread milling is a technique where threads are created through a milling cutter that is rotated in a helical toolpath around the product to be threaded. As different sized products are threaded, the milling cutter must be adjusted to accommodate the different sized products, and waste may be harder to manage.

SUMMARY

Disclosed is a combination tool for a thread milling system including: a tool mount configured to secure the combination tool on a thread milling machine of the thread milling system; a body connected to the tool mount, the body having a first end and a second end, the body defining a securing pocket; and a reaming insert secured proximate to the second end and within the securing pocket.

Also disclosed is a thread milling system including: a thread milling machine having a spindle; and a combination tool having a body and a reaming insert, the body having a first end and a second end, the body defining a securing pocket, the reaming insert secured proximate to the second end of the body and within the securing pocket, the second end of the body attached to the spindle Also disclosed is a method of operating a thread milling machine including: securing a product in a securing mount proximate to the thread milling machine, the thread milling machine having a spindle; securing a combination tool to the spindle, the combination tool having a body and an insert, the body having a first end and a second end, the body defining a securing pocket, the insert secured proximate to the second end at a first side of the securing pocket, the second end attached to the spindle; and rotating the spindle.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a thread milling system and associated methods, systems, devices, and various apparatus. The thread milling system can include a thread milling machine including a base assembly and a positioning assembly. The thread milling system further can include a combination tool and a threading tool. It would be understood by one of skill in the art that the disclosed thread milling system, including the thread milling machine, the combination tool, and the threading tool, is described in but a few exemplary embodiments among many. No particular terminology or description should be considered limiting on the disclosure or the scope of any claims issuing therefrom.

A thread milling machine may be used to create external threading or internal threading on various products such as rods, pipes, bolts, and other products that may utilize threading during use. In operation, a thread milling tool may be rotated by the thread milling machine while remaining at a single position. To create threading on a product, the product is moved to engage the thread milling tool and is then passed around the tool to create threading. In various applications, a user may also desire to ream or cut a product to neaten and smooth rough edges or surfaces of the product.

Figure 1:
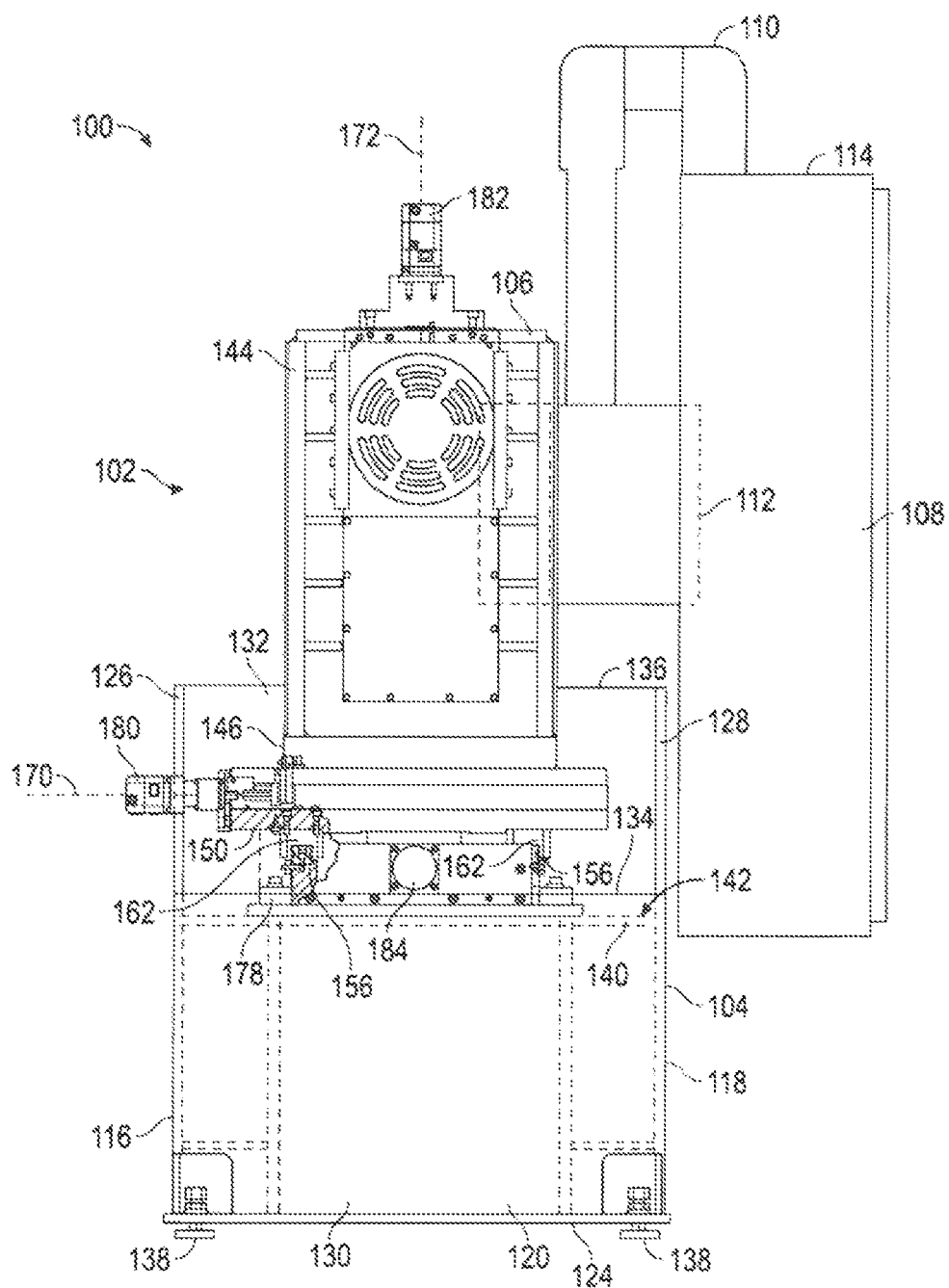
FIG. 1 is a rear view of a thread milling system in accordance with one embodiment of the current disclosure including a thread milling machine having a base assembly and a positioning assembly.
Figure 3:
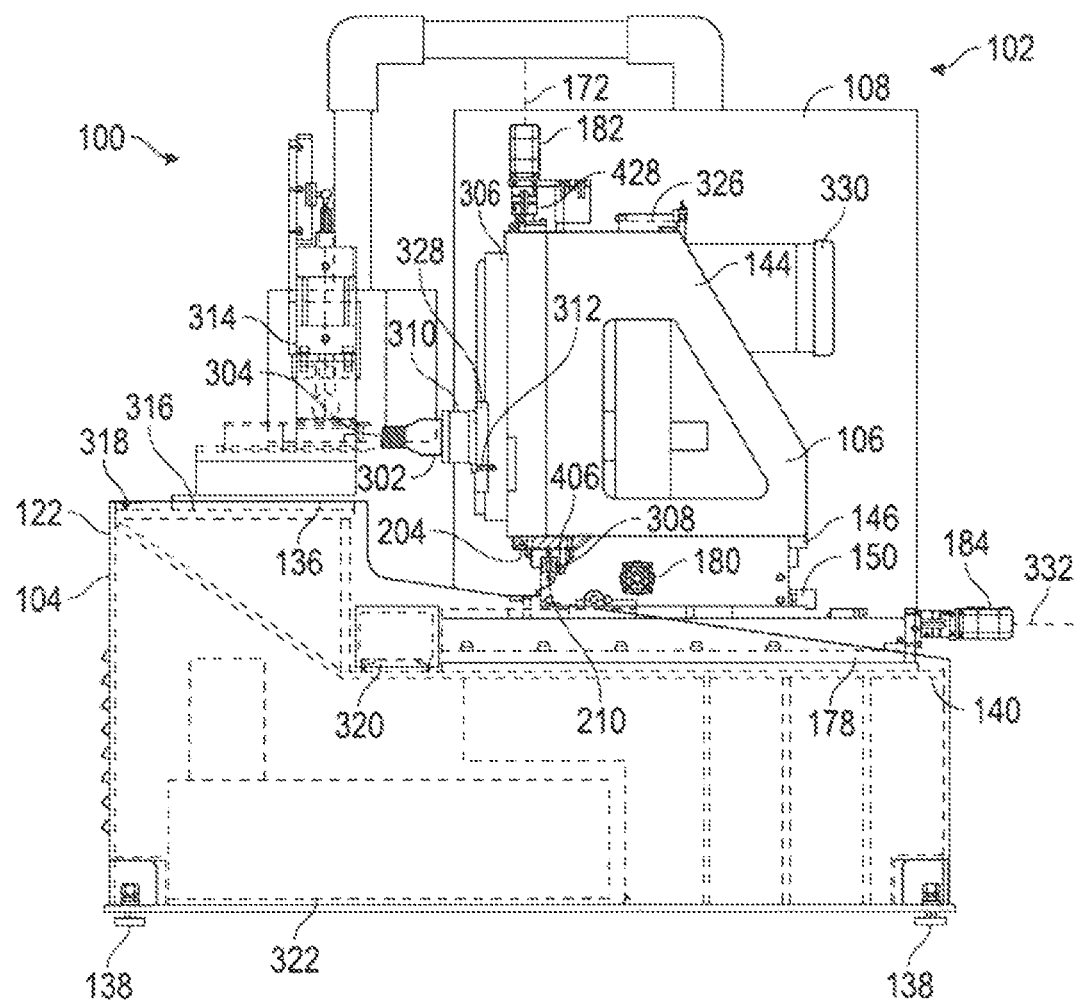
FIG. 3 is a side view of the thread milling system shown in FIG. 1 further including a combination tool and a threading tool.

One embodiment of a thread milling system 100 is disclosed and described in FIG. 1. As shown in FIG. 1, the thread milling system 100 includes a thread milling machine 102. As shown in FIG. 3, the thread milling system 100 further includes a combination tool 302 and a threading tool 304.

In various embodiments, the thread milling machine 102 includes a base assembly 104 and a positioning assembly 106. In various embodiments, the thread milling machine 102 also includes an electrical enclosure 108, a control panel 112, and an arm 110 between the electrical enclosure 108 and the control panel 112. In these embodiments, the control panel 112 is used to control various aspects of the thread milling machine 102 such as inputting relevant parameters required for a threading job. In various embodiments, the control panel 112 includes a touch screen enabling a user to set up a program, operate the thread milling machine 102 in manual mode, or operate the thread milling machine 102 in automatic mode. In various embodiments, the control panel 112 is in electrical communication with the thread milling machine 102 through wired communication or wireless communication. More specifically, in various embodiments, the control panel 112 is in electrical communication with various motors and movement mechanisms of the thread milling system 100 described below.

In various embodiments, the arm 110 is attached to a top side 114 of the electrical enclosure 108; however, in various other embodiments, the arm 110 is attached to other sides of the electrical enclosure 108. In various embodiments, the arm 110 is pivotable relative to the electrical enclosure 108 through a pivoting mechanism, such as a pivoting joint or other similar mechanisms. In various other embodiments, the arm 110 may be connected to the electrical enclosure 108 with mechanisms including, but not limited to, sliding mechanisms such that the arm 110 is slidable relative to the electrical enclosure 108, detachably fixed to the electrical enclosure 108 such that the arm 110 may be selectively removed and reattached to various locations on the enclosure 108 as desired, or fastenably secured relative to the electrical enclosure 108 such that the arm 110 remains attached at a single position on the enclosure 108. In various embodiments, the control panel 112 is rotably connected to the arm 110 through a rotating mechanism; however, in other embodiments, the control panel 112 may be connected to the arm 110 with mechanisms including, but not limited to, mechanisms such that the control panel 112 may be fixed relative to the arm 110, detachable relative to the arm 110, or pivotable relative to the arm 110.

The base assembly 104 of the thread milling machine 102 includes a left side 116, a right side 118, a front side 120, a back side 122 (shown in FIG. 3), and a lower side 124. As shown in FIG. 1, in various embodiments, the left side 116 includes a left side panel 126, the right side 118 includes a right side panel 128, the front side 120 includes a front side panel 130, and the back side 122 includes a back side panel 132. In various embodiments, the front side panel 130 may include an upper front end 134 and the back side panel 132 may include an upper back end 136. As shown in FIG. 1, in various embodiments, the upper back end 136 may extend above the upper front end 134. Stated another way, in various embodiments, a distance from the lower side 124 to the upper back end 136 may be greater than a distance from the lower side 124 to the upper front end 134. In various other embodiments, the distance from the lower side 124 to the upper back end 136 may be equal to or less than the distance from the lower side 124 to the upper front end 134.

As shown in FIG. 1, in various embodiments, the base assembly 104 includes feet 138 extending below the lower side 124. In the various embodiments, the feet 138 are adjustable such that a height of the thread milling machine 102 may be changed; however, in various other embodiments, the feet 138 may not be adjustable. Furthermore, in various other embodiments, the feet 138 may include rollers and brakes such that the thread milling machine is movable. In various other embodiments, no feet 138 are included with the base assembly 104. The disclosure of feet 138 should not be considered limiting on the current disclosure.

As shown in FIG. 1, in various embodiments, the base assembly 104 also includes a support panel 140. The support panel 140 extends between the left side 116, the right side 118, the front side 120, and the back side 122. In various embodiments, the support panel 140 is positioned below the upper front end 134; however, in various other embodiments, the support panel 140 is positioned at the upper front end 134, above the upper front end 134, below the upper back end 136, or at the upper back end 136. In various embodiments, the support panel 140 defines a support surface 142. In preferred embodiments, the support surface 142 is a substantially level surface. In various embodiments, making the support surface 142 substantially level may be partially achieved by adjusting the feet 138 as described previously. However, in various other embodiments, making the support surface 142 substantially level may be achieved through other methods such as adjusting the support panel 140 relative to the base assembly 104 or other suitable methods. As shown in FIG. 1, in various embodiments, the support surface 142 defines a surface upon which the positioning assembly 106 is mounted. In various embodiments, the positioning assembly 106 is mounted on the support surface 142 such that the positioning assembly 106 is fastenably secured to the support surface 142 of the support panel 140 through fasteners, screws, nuts, bolts, adhesive, and any other suitable mechanisms for securing the positioning assembly 106 to the base assembly 104. However, in various other embodiments, the positioning assembly 106 may be mounted onto the base assembly 104 without the use of any fasteners and may be detachably secured to the base assembly 104.

Figure 4:
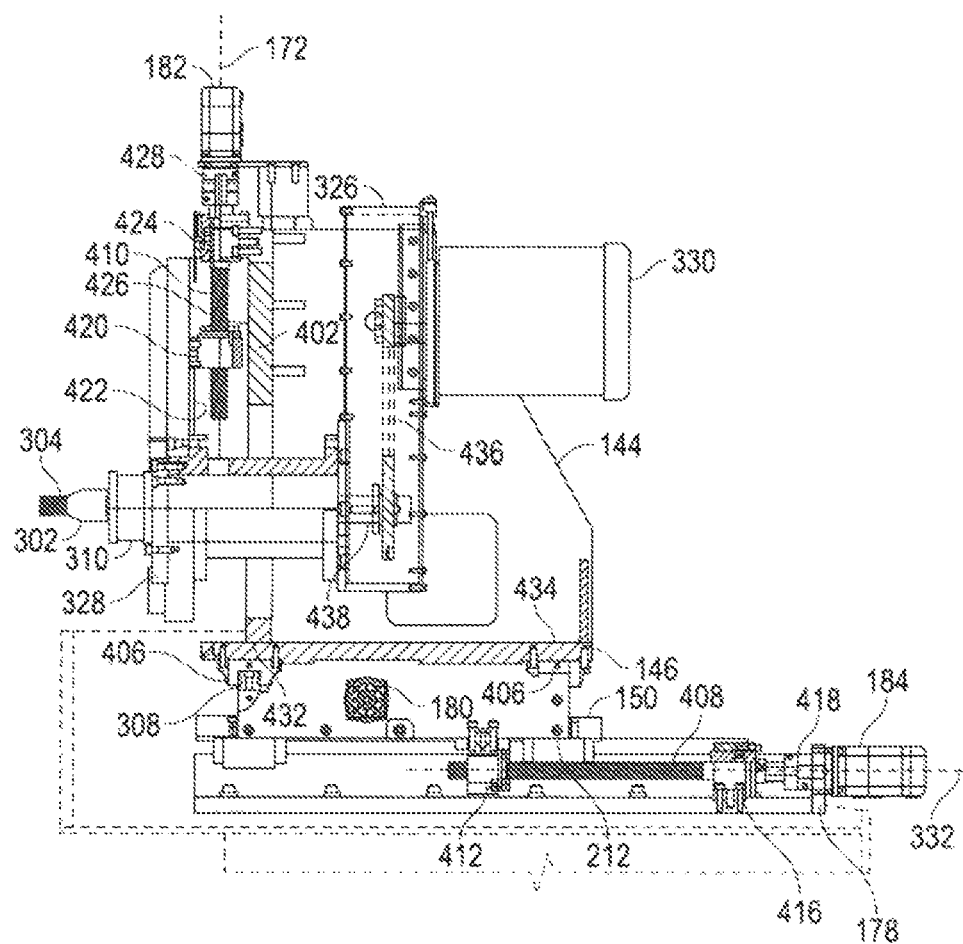
FIG. 4 is a side view of the positioning assembly of FIG. 1.

In various embodiments, the positioning assembly 106 includes a housing 144 which encloses a spindle motor 326 (shown in FIG. 4). In various embodiments, the positioning assembly 106 includes a horizontal base plate 178 and a vertical base plate 402 (shown in FIG. 4). The positioning assembly 106 also includes movement plates. In various embodiments, the movement plates are an x-axis plate 146, which is configured to move along an x-axis 170 of the base assembly 104, a y-axis plate 306 (shown in FIG. 3), which is configured to move along a y-axis 172 of the base assembly 104, and a z-axis plate 150, which is configured to move along a z-axis 332 (shown in FIG. 3) of the base assembly 104. The x-axis plate 146, y-axis plate 306, and z-axis plate 150 in combination provide three axes of movement. In various other embodiments, more than one horizontal base plate 178, more than one vertical base plate 402, more than one x-axis plate 146, more than one y-axis plate 306, or more than one z-axis plate 150 may be utilized. In various other embodiments, some plates may be omitted from the thread milling machine 102 while other plates are retained. The disclosure of plates or the number of plates should not be considered limiting on the current disclosure.

In various embodiments, the base plate 178 is secured to the support panel 140. In various embodiments, the base plate 178 is secured to the support panel 140 through fastening mechanisms such as those in the group including, but not limited to, fasteners, screws, nuts, bolts, adhesive, and any other suitable mechanisms for securing the base plate 178 to the support panel 140.

In various embodiments, the positioning assembly 106 includes x-axis rails 308 (one x-axis rail 308 shown in FIG. 4, and a second x-axis rail 308 shown in FIG. 5), y-axis rails 502 (shown in FIG. 5), and z-axis rails 156. In the present embodiment, the positioning assembly 106 includes two x-axis rails 308, two y-axis rails 502, and two z-axis rails 156. In these embodiments, the positioning assembly 106 further includes x-axis sliders 406 (shown in FIG. 4), y-axis sliders 504 (shown in FIG. 5), and z-axis sliders 162. In the present embodiment, the positioning assembly 106 includes two x-axis sliders 406, two y-axis sliders 504, and two z-axis sliders 162. Although rails 308,502,156 and sliders 406,504, 162 are described in the present embodiment, in various other embodiments, other mechanisms allowing for movement may be utilized such as wheels, ball bearings, sliding plates, or other similar mechanisms.

The positioning assembly 106 also includes an x-axis movement mechanism, a y-axis movement mechanism, and a z-axis movement mechanism in various embodiments. In the present embodiment, the z-axis movement mechanism is a z-axis ball-screw assembly 408 (shown in FIG. 4), the x-axis movement mechanism is an x-axis ball-screw assembly 202 (shown in FIG. 2), and the y-axis movement mechanism is a y-axis ball-screw assembly 410 (shown in FIG. 4). In various other embodiments, other movement mechanisms may be utilized. In various other embodiments, the movement mechanisms may be selected from the group including, but not limited to, hydraulic cylinders, gears, wheels, balls, pulleys, and any other mechanisms suitable for effecting movement.

In various embodiments, the positioning assembly 106 includes an x-axis motor 180, a y-axis motor 182, and a z-axis motor 184. However, in various other embodiments, any suitable mechanism creating sufficient force to cause movement along the various axes may be utilized. In various embodiments, the plates, rails, sliders, motors and movement mechanisms enable the positioning assembly to move along the x-axis 170, the y-axis 172, and the z-axis 332 as will be described below.

Figure 2:
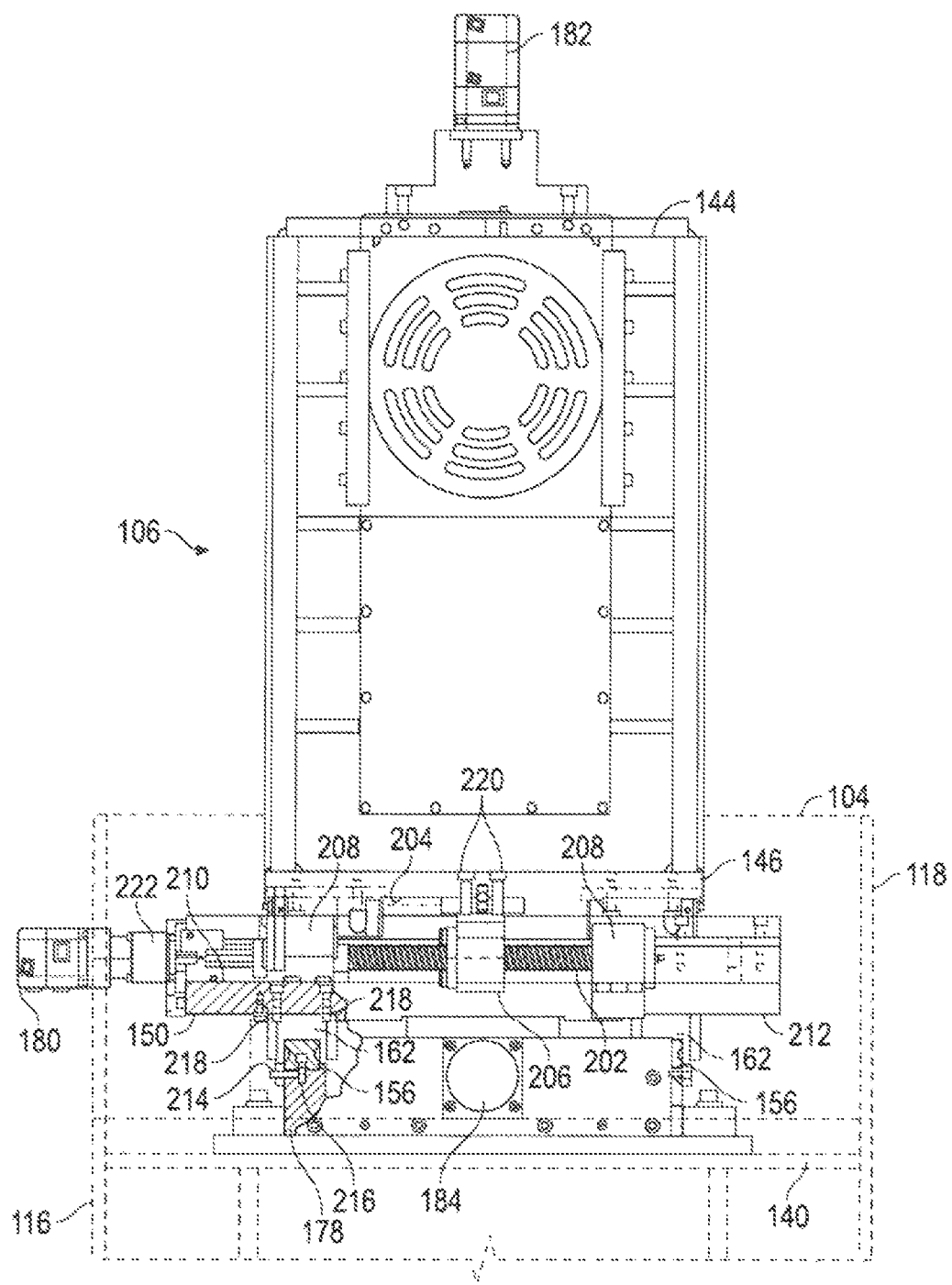
FIG. 2 is a rear view of the positioning assembly of FIG. 1.

As is shown in FIGS. 1 and 2, the positioning assembly 106 includes two z-axis rails 156 secured to the base plate 178 and two z-axis sliders 162 secured to a lower side 212 of the z-axis plate 150. In various embodiments, the rails 156 and sliders 162 are secured to the respective plates 178,150 through fasteners, screws, nuts, bolts, adhesive, and any other suitable mechanisms for securing rails and sliders to plates. As shown in FIGS. 1 and 2, in various embodiments, the z-axis sliders 162 slidably engage the z-axis rails 156 such that the sliders 162 may move along the rails 156.

In various embodiments, the z-axis ball-screw assembly 408 and z-axis motor 184 may be positioned between the z-axis rails 156. As shown in FIG. 4, the z-axis ball-screw assembly 408 includes a traveler 412 secured to the lower side 212 of the z-axis plate 150 and two anchors 416 secured to the base plate 178. In various embodiments, the z-axis motor 184 is connected to a z-axis coupler 418 which is coupled to the z-axis ball-screw assembly 408. In these embodiments, the z-axis motor 184 may move the traveler 412 along the z-axis ball-screw assembly 408. Movement of the traveler 412 in turn causes movement of the z-axis plate 150 and the z-axis sliders 162 along the z-axis rails 156, effecting movement of the positioning assembly 106 along the z-axis 332 of the base assembly 104. In various other embodiments, the z-axis movement mechanism and z-axis motor 184 may be positioned at locations other than between the z-axis rails 156. In various embodiments, the z-axis movement mechanism and z-axis motor 184 may be positioned outside the rails 156 such that the z-axis movement mechanism and z-axis motor 184 are secured to other positions on the base plate 178 and z-axis plate 150. Furthermore, in various other embodiments, additional the z-axis movement mechanisms and z-axis motors may be utilized. The positioning of the rails 156, the sliders 162, the z-axis movement mechanism, and the z-axis motor 184 relative to the base plate 178 and z-axis plate 150 should not be considered limiting on the current disclosure.

In various embodiments, as shown in FIGS. 3 and 4, the positioning assembly 106 further includes two x-axis rails 308 secured to a top side 210 of the z-axis plate 150 and two x-axis sliders 406 secured to a lower side 204 of the x-axis plate 146. In various embodiments, the rails 308 and sliders 406 are secured to the respective plates 150,146 through fasteners, screws, nuts, bolts, adhesive, and any other suitable mechanisms for securing rails and sliders to plates. As shown in FIGS. 3 and 4, in various embodiments, the x-axis sliders 406 slidably engage the x-axis rails 308.

As shown in FIGS. 2 and 3, in various embodiments, the x-axis ball-screw assembly 202 and the x-axis motor 180 are positioned between the x-axis rails 308. As shown in FIG. 2, the x-axis ball-screw assembly 202 includes a traveler 206 secured to the lower side 204 of the x-axis plate 146 and two anchors 208 secured to the top side 210 of the z-axis plate 150. In various embodiments, the x-axis motor 180 is connected to an x-axis coupler 222 which is coupled to the x-axis ball-screw assembly 202. In these embodiments, the x-axis motor 180 may move the traveler 206 along the x-axis ball-screw assembly 202. Movement of the traveler 206 in turn causes movement of the x-axis plate 146 and the x-axis sliders 406 along the x-axis rails 308, effecting movement of the positioning assembly 106 along the x-axis 170. In various other embodiments, the x-axis movement mechanism and x-axis motor 180 may be positioned at locations other than between the x-axis rails 308. In various embodiments, the x-axis movement mechanism and x-axis motor 180 may be positioned outside the rails 308 such that the x-axis movement mechanism and x-axis motor 180 are secured to other positions on the x-axis plate 146 and z-axis plate 150. Furthermore, in various other embodiments, additional x-axis movement mechanisms and x-axis motors may be utilized. The positioning of the rails 308, the sliders 406, the x-axis movement mechanism, and the x-axis motor 180 relative to the x-axis plate 146 and z-axis plate 150 should not be considered limiting on the current disclosure.

Figure 5:
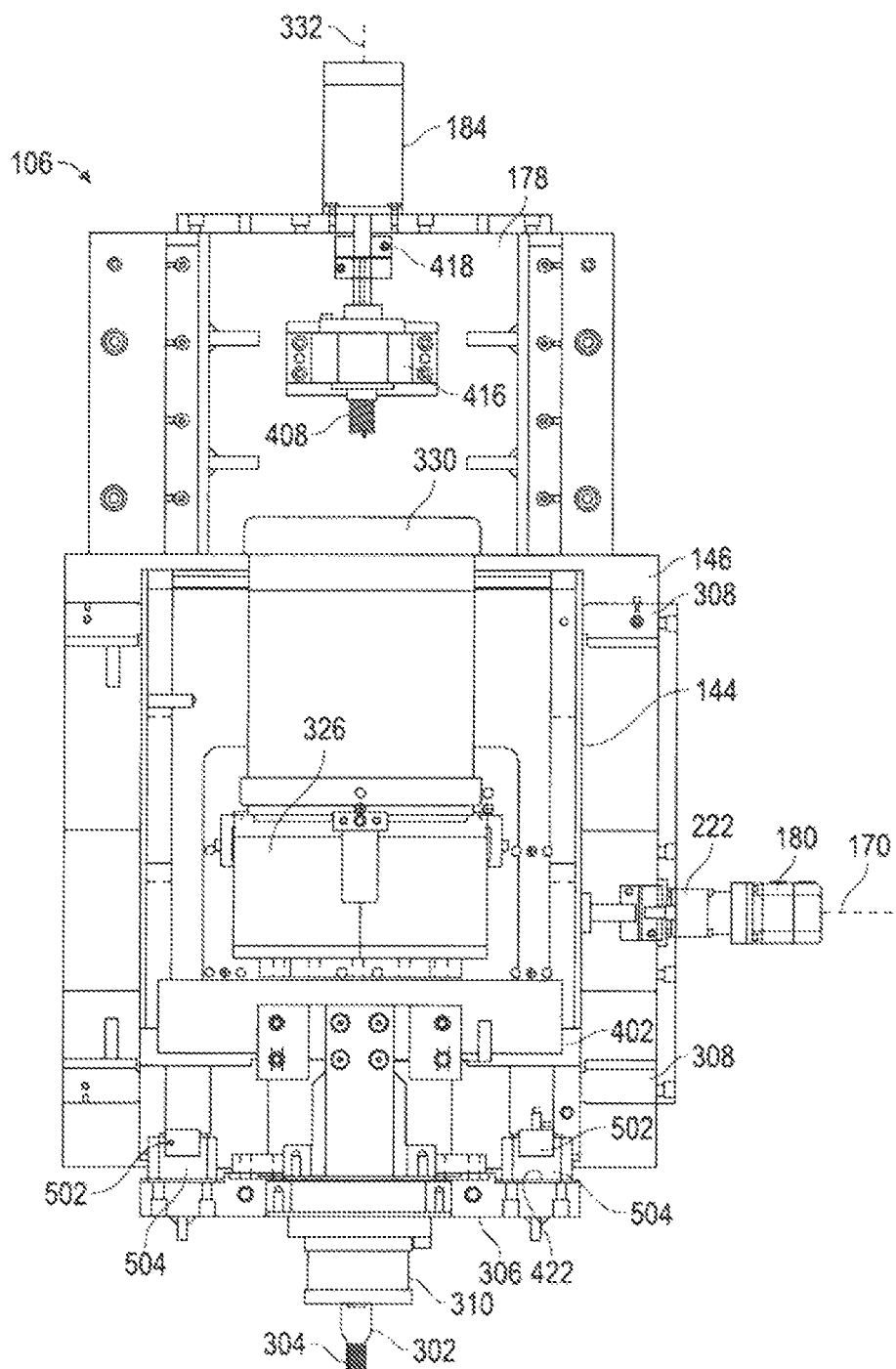
FIG. 5 is a top view of the thread milling system shown in FIG. 1.

In various embodiments, as shown in FIG. 5, the positioning assembly 106 further includes two y-axis rails 502 secured to the vertical base plate 402 and two y-axis sliders 504 secured to a first side 422 of the y-axis plate 306. In various embodiments, the rails 502 and sliders 504 are secured to the respective plates 402,306 through fasteners, screws, nuts, bolts, adhesive, and any other suitable mechanisms for securing rails and sliders to plates. As shown in FIG. 5, in various embodiments, the y-axis sliders 504 slidably engage the y-axis rails 502.

In various embodiments, the y-axis ball-screw assembly 410 and the y-axis motor 182 are positioned between the y-axis rails 502. As shown in FIG. 4, the y-axis ball-screw assembly 410 includes a traveler 420 secured to the first side 422 of the y-axis plate 306 and two anchors 424 secured to a side 426 of the vertical base plate 402. In various embodiments, the y-axis motor 182 is connected to a y-axis coupler 428 which is coupled to the y-axis ball-screw assembly 410. In these embodiments, the y-axis motor 182 may move the traveler 420 along the y-axis ball-screw assembly 410. Movement of the traveler 420 in turn causes movement of the y-axis plate 306 and y-axis sliders 504 along the y-axis rails 502, effecting movement of the positioning assembly 106 along the y-axis 172. In various other embodiments, the y-axis movement mechanism and y-axis motor 182 may be positioned at locations other than between the y-axis rails 502. In various embodiments, the y-axis movement mechanism and y-axis motor 182 may be positioned outside the rails 502 such that the y-axis movement mechanism and y-axis motor 182 are secured to other positions on the y-axis plate 306 and vertical base plate 404. Furthermore, in various other embodiments, additional y-axis movement mechanisms and y-axis motors may be utilized. The positioning of the rails 502, the sliders 504, the y-axis movement mechanism, and the y-axis motor 182 relative to the y-axis plate 306 and vertical base plate 404 should not be considered limiting on the current disclosure.

FIG. 2 is a partially transparent detailed view of the positioning assembly of FIG. 1 taken from detail circle 2 in FIG. 1. As is partially shown in FIG. 2, the z-axis rails 156 are secured to a top side 214 of the base plate 178 with fasteners 216 such as nuts, bolts, screws, and other suitable fasteners for securing rails 156 to the plate 178. Fasteners similar to fasteners 216 may be utilized to secure the x-axis rails 308 to the z-axis plate 150 and to secure the y-axis rails 502 vertical base plate 404.

As shown in FIG. 2, in various embodiments, the z-axis sliders 162 are secured to the lower side 212 of the z-axis plate 150 with fasteners 218 such as nuts, bolts, screws, and other suitable fasteners for securing sliders 162 to the plate 150. In various embodiments, fasteners similar to fasteners 218 may be utilized to secure the x-axis sliders 406 to the x-axis plate 146 and secure the y-axis sliders 504 to the y-axis plate 306.

As shown in FIG. 2, in various embodiments, fasteners 220 such as nuts, bolts, screws, and other suitable fasteners may be utilized to secure the x-axis ball-screw assembly 202 to the z-axis plate 150 and x-axis plate 146 respectively. In various embodiments, fasteners similar to fasteners 220 may be utilized to secure the y-axis ball-screw assembly 410 to the vertical base plate 404 and the y-axis plate 306 and to secure the z-axis ball-screw assembly 408 to the horizontal base plate 178 and the z-axis plate 150.

FIG. 3 is a partially transparent side view of the thread milling system 100. As shown in FIG. 3, the thread milling system 100 includes the thread milling machine 102, the combination tool 302, and the threading tool 304 in various embodiments.

In various embodiments, the thread milling machine 102 includes a spindle 310 rotably secured to the positioning assembly 106. In various embodiments, the spindle 310 includes a spindle mount 328. As shown in FIG. 3, in various embodiments, the spindle mount 328 is attached to the positioning assembly 106 with fasteners 312 such as fasteners from the group including, but not limited to, screws, nuts, bolts, adhesive, and any other suitable mechanisms for securing the spindle 310 and spindle mount 328 to the positioning assembly 106. In various embodiments, the spindle 310 is rotatable on the spindle mount 328. In various embodiments, the spindle mount 328 is secured to the y-axis plate 306. In various other embodiments, the spindle mount 328 may be detachably connected to the positioning assembly 106 such as detachably connected to the y-axis plate 306.

As shown in FIG. 3, in various embodiments, the thread milling system 100 further includes a securing mount 314. In various embodiments, the securing mount 314 accepts a product to be machined (not shown) and secures the product while the thread milling machine 102 is in operation on the product. In various embodiments, the securing mount 314 is adjustable to accept products of differing dimensions. In various embodiments, the product is the pipe element, and the securing mount 314 secures the pipe element in place while the thread milling machine 102 is in operation on the product.

In various embodiments, the base assembly 104 further defines a securing panel 316. As shown in FIG. 3, in various embodiments, the securing panel 316 is positioned at the back side 122 of the base assembly 104. In various embodiments, the securing panel 316 is positioned such that the securing panel 316 is below the upper back end 136 and above the support panel 140. In various embodiments, the securing panel 316 can be positioned at the upper back end 136 or above the upper back end 136. As shown in FIG. 3, in various embodiments, the securing panel 316 defines a securing surface 318. In various embodiments, the securing surface 318 is a substantially level surface. In various embodiments, a substantially level securing surface 318 may be achieved through mechanisms similar to those used for the support panel 140.

As shown in FIG. 3, in various embodiments, the securing surface 318 may define a surface upon which the securing mount 314 is mounted. In various embodiments, the securing mount 314 is mounted on the securing surface 318 such that the securing mount 314 is secured to the securing surface 318. Fasteners, screws, nuts, bolts, adhesive, and any other suitable mechanisms may be utilized for mounting the securing mount 314 to the securing panel 316. However, in various other embodiments, the securing mount 314 may be mounted onto the securing panel 316 without the use of any fasteners. In various embodiments, the securing panel 316 may include a movement mechanism for movement of the securing panel 316 and securing mount 314 along an axis relative to the positioning assembly 106. In various embodiments, the movement mechanism may include a sliding mechanism; however, in various other embodiments, other movement mechanisms such as those in the group including, but not limited to, hydraulics, gears, pulleys, and any other suitable mechanism may be utilized.

As shown in FIG. 3, in various embodiments, the base assembly 104 further includes a waste basket 320 on the support panel 140 between the positioning assembly 106 and the mount 314. In various embodiments, the waste basket 320 is detachably connected to the support panel 140. In operation, as the product to be machined is being cut by the positioning assembly 106, waste product is directed into the waste basket 320 through a channeling mechanism such as channeling panels (not shown).

In various embodiments, the base assembly 104 includes a coolant tank 322. In various embodiments, the coolant tank 322 holds coolant that is used in the thread milling process. As shown in FIG. 3, in various embodiments, the housing 144 of the positioning assembly 106 houses a spindle motor 326. As will be described in greater detail with reference to FIG. 4, the spindle motor 326 effectuates rotation of the spindle 310 during operation of the thread milling machine 102. As shown in FIG. 3, in various embodiments, the positioning assembly 106 also includes an exhaust duct 330 in various embodiments. In various embodiments, the exhaust duct 330 is used with the spindle motor 326 to ensure proper ventilation is provided for the spindle motor 326.

FIG. 4 is a partially transparent detailed view of the positioning assembly 106 taken from detail circle 4 in FIG. 3. As shown in FIG. 4 and previously described, in various embodiments, the positioning assembly 106 includes the z-axis ball-screw assembly 408 having the traveler 412 and anchors 416. In various embodiments, the positioning assembly 106 further includes the z-axis coupler 418 connecting the z-axis motor 184 with the z-axis ball-screw assembly 408.

As shown in FIG. 4, in various embodiments, the positioning assembly 106 includes the y-axis ball-screw assembly 410 having the traveler 420 secured to the y-axis plate 306 and anchors 424 secured to the vertical base plate 402. In various embodiments, the y-axis motor 182 is connected to the y-axis coupler 428, which is coupled to the y-axis ball-screw assembly 410. As shown in FIG. 4, in various embodiments, the vertical base plate 402 includes an end 432 that is positioned on a top side 434 of the x-axis plate 146. In various embodiments, the vertical base plate 402 is secured to the x-axis plate 146 with fastening mechanisms from the group including, but not limited to, fasteners, screws, nuts, bolts, adhesives, and any other fastening mechanisms suitable for securing the vertical base plate 402.

In various embodiments, the spindle motor 326 includes a belt and pulley system 436, as shown in FIG. 4. In various embodiments, the belt and pulley system 436 causes rotation of a spindle core 438. The disclosure of the motor 326 with the belt and pulley system 166 should not be considered limiting on the current disclosure. In various other embodiments, other mechanisms may be utilized to cause rotation of the spindle core 438 and spindle 310. As is partially shown in FIG. 4, the spindle core 438 extends from the spindle 310 to the spindle motor 326. In various embodiments, the spindle core 438 includes an engagement mechanism that engages the spindle 310. In various embodiments, rotation of the spindle core 438 effectuates rotation of the spindle 310. As will be described below in greater detail with reference to FIGS. 6-9, rotation of the spindle 310 causes rotation of the combination tool 302 and the threading tool 304.

FIG. 5 is a partially transparent top view of the thread milling machine 102. As shown in FIG. 5, in various embodiments, the thread milling machine 102 includes two x-axis rails 308 and two y-axis rails 502. Although not shown in FIG. 5, in various embodiments, the thread milling machine 102 also includes two z-axis rails 156. In various other embodiments, the thread milling machine 102 may include a single x-axis rail 308, a single y-axis rail 502, and a single z-axis rail 156; however, the number of rails 308,502,156 should not be considered limiting on the current disclosure. Furthermore, as described above, in various other embodiments, other mechanisms enabling movement may be utilized in place of rails 308,502,156.

Figure 6:
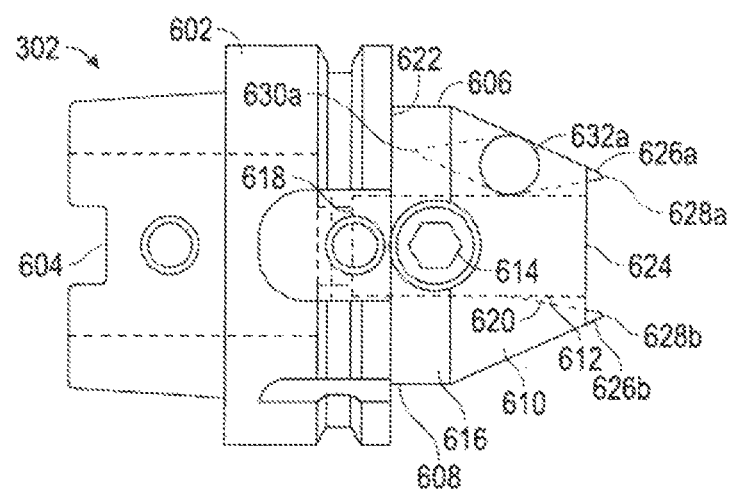
FIG. 6 is a side view of a combination tool in accordance with one embodiment of the current disclosure.

FIG. 6 shows a partially transparent side view of the combination tool 302, which is capable of both cutting a product and threading a product. As shown in FIG. 6, in various embodiments, the combination tool 302 includes a tool mount 602. The tool mount 602 is configured to secure the combination tool 302 on the spindle 310 when the combination tool 302 is mounted for use with the thread milling machine 102. As shown in FIG. 6, in various embodiments, the tool mount 602 includes an engagement groove 604 for engagement with spindle 310 or the spindle core 438 when the combination tool 302 is mounted. In various other embodiments, other engagement mechanisms may be utilized to connect the combination tool 302 with the spindle 310 such that combination tool 302 rotates with the spindle 310. In various embodiments, fasteners, such as fasteners from the group including, but not limited to, screws, bolts, nuts, and other suitable fastening mechanisms, may also be utilized to secure the combination tool 302 to the spindle 310.

In various embodiments, the combination tool 302 includes a tool body 606 connected to the tool mount 602. The tool body 606 comprises a first end 622 and a second end 624. In various embodiments, the tool body 606 includes a first body portion 608 and a second body portion 610. In various embodiments, the first body portion 608 has a cylindrical shape and the second body portion 610 has a truncated cone shape. The tool body 606 defines a securing pocket 612. The tool body 606 defines an inner end 618 of the securing pocket 612 and a side wall 620 of the securing pocket 612. The securing pocket 612 is dimensioned to accept the threading tool 304 within the securing pocket 612. In various embodiments, the side wall 620 extends from the inner end 618 to the second end 624. The tool body 606 defines a securing pocket opening 802 (shown in FIG. 8) at the second end 624. As shown in FIG. 6, in various embodiments, the securing pocket opening 802 is dimensioned to accept the threading tool 304 through the securing pocket opening 802 and into the securing pocket 612.

In various embodiments, the securing pocket 612 has a diameter sized and configured for accepting and holding at least a portion of the threading tool 304 within the securing pocket 612. In various embodiments, the combination tool 302 includes a fastener 614 that is utilized to secure the threading tool 304 within the securing pocket 612. The fastener 614 is positioned in a bore (not shown) defined in the tool body 606 that extends from an outer surface 616 of the tool body 606 to the securing pocket 612. When the threading tool 304 is positioned in the securing pocket 612, the fastener 614 may be tightened such that the fastener 614 engages the threading tool 304 and holds the threading tool 304 in place within the securing pocket 612. In various embodiments, the fastener 614 may be from the group including, but not limited to, nuts, bolts, screws, adhesives, or other types of fasteners suitable for securing the threading tool 304 within the securing pocket 612. In various embodiments, after the threading tool 304 is secured in the securing pocket 612, rotation of the spindle 310 and the combination tool 302 causes rotation of the threading tool 304. In various embodiments, the threading tool 304 may have a maximum revolutions per minute (RPM) of 3500 RPM, a maximum of 7200 RPM, a maximum of 10,000 RPM, or a maximum of more than 10,000 RPM. In various embodiments, after the threading tool 304 is at a desired RPM, the combination tool 302 with threading tool 304 can thread a product such as a pipe.

As shown in FIG. 6, in various embodiments, the combination tool 302 includes reaming inserts 626a,b. Each reaming insert 626a,b may be secured in an insert groove (not shown). The insert grooves are defined in the tool body 606. In various embodiments, the insert grooves are defined in the side wall 620 of the securing pocket 612. In various other embodiments, the insert grooves are not defined in the side wall 620 of the securing pocket 612 and may be defined at other locations on the tool body 606. The insert grooves may be defined in the tool body 606 proximate to the second end 624. In various embodiments, the insert grooves may be defined on opposite sides of the securing pocket 612 proximate to the second end 624 in various embodiments. The number of reaming inserts 626 should not be considered limiting on the current disclosure as in various other embodiments, the combination tool 302 includes one reaming insert 626, more than two reaming inserts 626, or no reaming inserts 626. In various embodiments, the reaming inserts 626a,b have a rhomboid cross-section; however, in various other embodiments, the reaming inserts 626a,b may have a square, triangular, star, or any other desired cross-sectional shape. As shown in FIG. 6, in various embodiments, the reaming inserts 626a,b have a front edge 628a,b and a back edge 630a,b (630b shown in FIG. 8), respectively. In various embodiments, reaming inserts 626a,b are cutting inserts and the front edges 628a,b are cutting edges capable of reaming a surface of a product. In various other embodiments, the front edges 628a,b and the back edges 630a,b of each reaming insert 626a,b are cutting edges, respectively, such that the reaming inserts 626a,b are reversible. In the present embodiment, the reaming inserts 626a,b are inserts sold by Sandvik Coromat under the trade name VBMT 331-PM; however, in various other embodiments, various other insert types and models may be utilized for the reaming inserts 626a,b. The reaming inserts 626a,b may be secured to the tool body 606 through fasteners 632a,b (632b shown in FIG. 8), respectively. The fasteners 632a,b may be fasteners from the group including, but not limited to, bolts, nuts, screws, or other suitable fasteners. In various embodiments, the reaming inserts 626a,b are at least partially rotatable about the fasteners 632a,b, respectively, such that the reaming inserts 626a,b may pivot or otherwise rotate relative to the tool body 606, respectively. Pivoting of the reaming inserts 626a,b enables the combination tool 302 to accommodate a variety of different dimensioned products during a cutting process. In various embodiments, the reaming inserts 626a,b, are pivotable such that a distance between the front edges 628a,b is adjustable to accommodate and cut products of varying diameters. In various embodiments, the distance may be adjustable to be greater than a diameter of the securing pocket 612, less than the diameter of the securing pocket 612, or equal to the diameter of the securing pocket 612.

The reaming inserts 626a,b may be used to ream, cut, or otherwise interact with a product when the threading tool 304 is not present in the securing pocket 612. In various embodiments, the front edges 628a,b may contact an outer surface of a product placed between the front edges 628a,b. In these embodiments, the product is cut or reamed by the inserts 626a,b, which rotate around the product as the spindle 310 and combination tool 302 are rotated by the thread milling machine 102. As previously described, the reaming inserts 626a,b may accommodate a variety of different-dimensioned products without having to change the combination tool 302.

Figure 7:
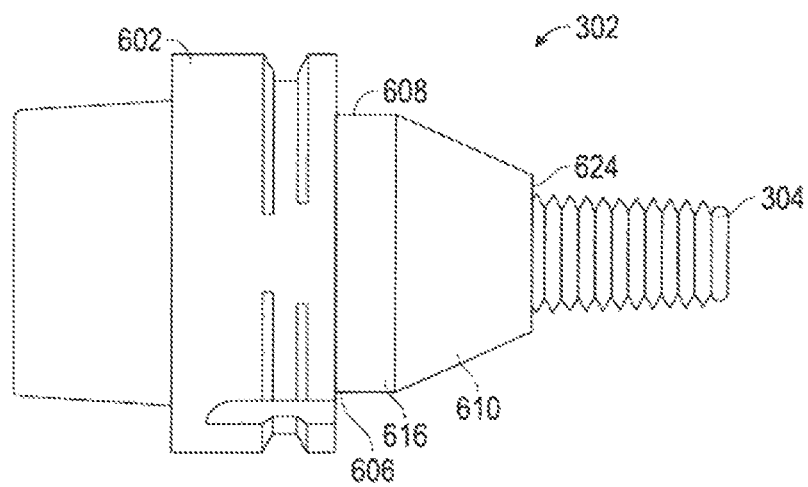
FIG. 7 is another side view of the combination tool of FIG. 6.
Figure 8:
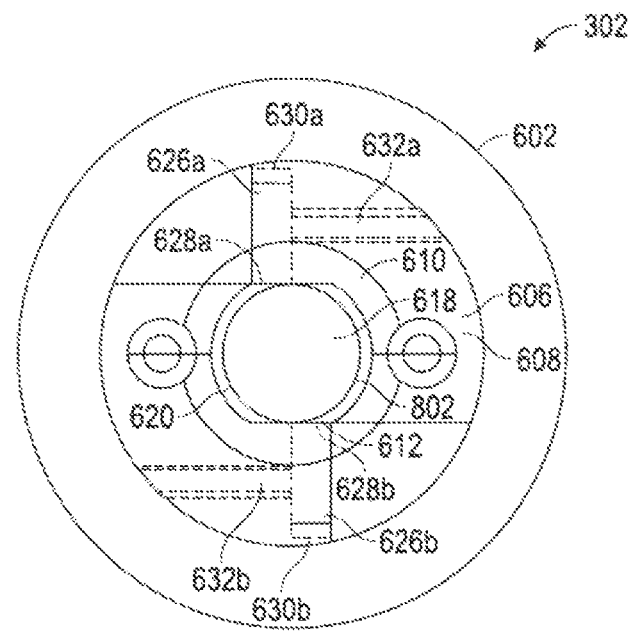
FIG. 8 is a front view of the combination tool of FIG. 6.

FIG. 7 shows another side view of the combination tool 302 with the threading tool 304 inserted into the securing pocket 612. FIG. 7 shows the combination tool 302 with the reaming inserts 626a,b removed. In various embodiments, the threading tool 304 may be secured to the combination tool 302 with either the reaming inserts 626a,b removed or with the reaming inserts 626a,b remaining on the combination tool 302. FIG. 8 is a front view of the combination tool 302 showing the reaming insert 626a distal from the reaming insert 626b. As shown in FIG. 8, in various embodiments the reaming inserts 626a,b are on opposite sides of the securing pocket 612 adjacent to the securing pocket opening 802 (shown in FIG. 8) at the second end 624.

Figure 9:
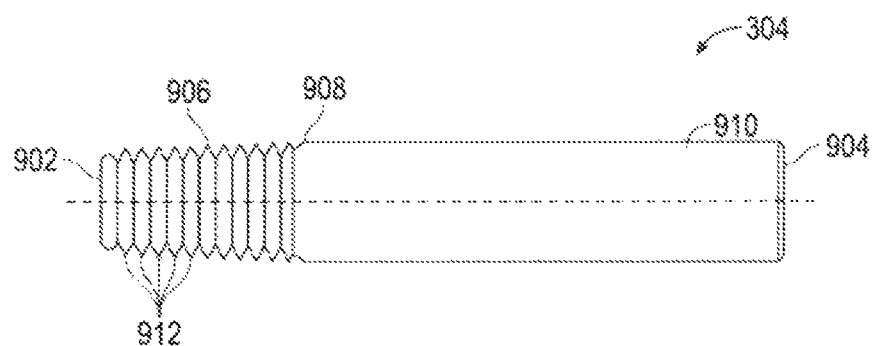
FIG. 9 is side view of a threading tool in accordance with one embodiment of the current disclosure.

FIG. 9 is a side view of the threading tool 304. As shown in FIG. 9, in various embodiments, the threading tool 304 has a first end 902 and a second end 904. In various embodiments, the threading tool 304 defines a toothed portion 906 between the first end 902 and an intermediary position 908. In various embodiments, the threading tool 304 also defines a substantially cylindrical portion 910 between the second end 904 and the intermediary position 908. As shown in FIG. 9, in various embodiments, the toothed portion 906 defines a tapered tooth profile. In these embodiments, the toothed portion 906 includes vanishing threads 912 proximate to the first end 902. The vanishing threads 912 of the tapered tooth profile are threads that progressively decrease in diameter such that a vanishing thread 912 closer to the intermediary position 908 has a diameter greater than a vanishing thread closer to the first end 902. In various other embodiments, the regular threads or various other types of threads may be used in place of the vanishing threads 912.

In various embodiments, a distance from the second end 904 to the first end 902 of the threading tool 304 is greater than a distance from the inner end 618 of the securing pocket 612 to the second end 624 of the combination tool 302. In various embodiments, a distance from the second end 904 to the intermediary position 908 of the threading tool 304 is greater than a distance from the inner end 618 of the securing pocket 612 to the second end 624 of the combination tool 302. In these embodiments, when the threading tool 304 is inserted into the securing pocket 612, the toothed portion 906 of the threading tool 304 extends outwards from the securing pocket 612, as illustrated in FIG. 7.

A method of assembling the thread milling system 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure.

In various embodiments, the thread milling system 100 includes the thread milling machine 102 having the base assembly 104 and the positioning assembly 106. As shown in FIG. 3, in various embodiments, the positioning assembly 106 is mounted onto a support panel 140 of the base assembly 104 and is movable along the x-axis 170, the y-axis 172, and the z-axis 332. After the positioning assembly 106 is mounted on the base assembly 104, the combination tool 302 is detachably connected to the spindle 310 of the positioning assembly 106. In various embodiments, after the combination tool 302 is detachably connected to the spindle 310, the threading tool 304 may be connected to the combination tool 302 in the securing pocket 612 of the combination tool 302. In various other embodiments, the threading tool 304 may be connected to the combination tool 302 prior to the combination tool 302 being detachably connected to the spindle 310.

A method of assembling the thread milling system 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure.

In various embodiments, the thread milling system 100 includes the thread milling machine 102 having the base assembly 104 and the positioning assembly 106. As shown in FIG. 3, in various embodiments, the positioning assembly 106 is mounted onto the support panel 140 of the base assembly 104. In various embodiments, the positioning assembly 106 includes a spindle 310 that engages the spindle core 438 such that rotation of the spindle core 438 rotates the spindle 310. After the positioning assembly 106 is mounted on the base assembly 104, a combination tool 302 is then secured with the spindle 310. In various embodiments, the engagement groove 604 of the combination tool 302 is utilized to secure the combination tool 302 with the spindle 310. In various other embodiments, fasteners may be utilized to secure the combination tool 302 within the spindle 310.

The threading tool 304 is inserted into the securing pocket 612 of the combination tool 302 in various embodiments. A fastener 614 or plurality of fasteners may be utilized to secure the threading tool 304 within the securing pocket 612 such that the threading tool 304 rotates when the combination tool 302 and spindle 310 rotate. In various embodiments, the second end 904 of the threading tool 304 is inserted into the securing pocket 612 such that the toothed portion 906 is not within the securing pocket 612.

A method of using the thread milling system 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure.

In various embodiments, the thread milling system 100 includes the thread milling machine 102 having the base assembly 104 and the positioning assembly 106. In various embodiments, the positioning assembly 106 is movable along the z-axis 332 through the z-axis rails 156, the z-axis movement mechanism such as the z-axis ball-screw assembly 408, and the z-axis motor 184. In various embodiments, the positioning assembly 106 is movable along the y-axis 172 through the y-axis rails 502, the y-axis movement mechanism such as the y-axis ball-screw assembly 410, and the y-axis motor 182. In various embodiments, the positioning assembly 106 is movable along the x-axis 170 through the x-axis rails 308, the z-axis movement mechanism such as the x-axis ball-screw assembly 202, and the z-axis motor 184.

In various embodiments, after the positioning assembly 106 is mounted onto the base assembly 104, the combination tool 302 is detachably connected to the spindle 310 of the positioning assembly 106. In various embodiments where the user wants to thread a product, the threading tool 304 is then inserted into the securing pocket 612 of the combination tool 302. In various embodiments where the user wants to ream, cut, or otherwise clean the product, the threading tool 304 may not inserted into the securing pocket 612.

After the combination tool 302 is secured to the spindle 310, a product is secured in a securing mount 314. In various embodiments, the product is a pipe. In various embodiments, the securing mount 314 is adjustable or otherwise movable such that after the pipe is secured in the securing mount 314, the securing mount 314 may move the pipe from a location distal from the spindle 310 and combination tool 302 to a position proximate to the spindle 310 and combination tool 302.

In various embodiments, the user manually enters in x-axis 170 movement, y-axis 172 movement, and z-axis 332 movement on the control panel 112 for the thread milling machine 102. In various other embodiments, the user enters in pipe dimensions on the control panel 112 and the thread milling machine 102 automatically determines proper x-axis 170 movement, y-axis 172 movement, and z-axis 332 movement.

After the pipe dimensions are provided to the thread milling machine 102, the spindle motor 326 begins rotating the spindle core 438 engaged with the spindle 310. In various embodiments, after the spindle core 438 and spindle 310 have reached a suitable RPM, the thread milling machine 102 moves the positioning assembly 106 along the z-axis 332 such that the toothed portion 906 is positioned adjacent to an end of the pipe. In various embodiments, after the appropriate z-axis 332 positioning is achieved, the positioning assembly 106 moves along the x-axis 170 and y-axis 172 such that the toothed portion 906 of the threading tool 304 engages the pipe end. After the toothed portion 906 of the threading tool 304 engages the pipe end, the positioning assembly moves along the x-axis 170 and y-axis 172 around the pipe end such that the toothed portion 906 engages the pipe end for one pass around the pipe end. In various embodiments, after the threading tool 304 makes one pass around the pipe end, the positioning assembly 106 disengages the threading tool 304 from the pipe end by moving along the x-axis 170, y-axis 172, and z-axis 332. In various embodiments, the positioning assembly 106 disengages the threading tool 304 from the pipe end after the threading tool 304 has made multiple passes around the pipe end.

In various embodiments, as the threading tool 304 moves around the pipe end, the thread milling machine 102 may supply coolant onto the threading tool 304 and pipe through coolant nozzles (not shown). The coolant for the coolant nozzles may be supplied from the coolant tank 322 in various embodiments. In various embodiments, the coolant can be a water-based coolant. As the pipe is threaded by the threading tool 304, the threading produces very fine waste chips. In various embodiments, waste produced by threading is channeled into the waste basket 320 on the thread milling machine 102 for later disposal.

In various embodiments where the user desires to cut or ream a pipe, no threading tool 304 is inserted into the securing pocket 612 of the combination tool. In these embodiments, after the pipe is secured in the securing mount 314 and the user inputs pipe dimensions on the control panel 112 as described above, the spindle motor 326 begins rotating the spindle core 438 engaged with the spindle 310. In various embodiments, after the spindle core 438 and spindle 310 have reached a suitable RPM, the thread milling machine 102 moves the positioning assembly 106 along the x-axis 170, y-axis 172, and z-axis 332 such that the edges 628a,b of the reaming inserts 626a,b, respectively, are positioned adjacent to the end of the pipe. In various embodiments, the positioning assembly 106 then moves along the x x-axis 170, y-axis 172, and z-axis 332 such that the edges 628a,b of the reaming inserts 626a,b, respectively, engage the end of the pipe between the front edges 628a,b. In these embodiments, the product is cut or reamed by the reaming inserts 626a,b as the spindle 310 and combination tool 302 rotate. As previously described, the reaming inserts 626a,b may accommodate a variety of different dimensioned products without having to change the combination tool 302. After the desired amount of cutting is achieved, the positioning assembly 106 then moves along the x-axis 170, y-axis 172, and z-axis 332 such that the edges 628a,b of the reaming inserts 626a,b, respectively, disengage the end of the pipe.

In various embodiments, as the reaming inserts 626a,b cut the pipe end, the thread milling machine 102 may supply coolant onto the pipe through the coolant nozzles. As the pipe is cut by the reaming inserts 626a,b, in various embodiments, the cutting produces very fine waste chips. In various embodiments, waste produced by threading is channeled into the waste basket 320 on the thread milling machine 102 for later disposal.

This assembly configuration represents one of many possible assembly configurations for the thread milling system 100. One skilled in the art will understand that obvious variations of this assembly configuration are included within this disclosure, including variations of steps, combinations of steps, and dissections of steps, among others. Where materials are chosen for the elements of this assembly, particularly rubber, metal, and plastic, similar material choices may also be used and would be obvious to one in the art.

In particular, in various embodiments the thread milling machine 102, including the base assembly 104 and positioning assembly 106, is constructed from steel, iron, or other similar materials of sufficient strength to provide sufficient stability as the thread milling machine 102 is in operation. In various embodiments, the combination tool 302 is constructed from steel, iron, stainless steel, or other similar materials of sufficient strength and flexibility to both support the threading tool 304 and withstand the loads placed on it while rotating, cutting or threading of products, and moving the combination tool 302 along the x-axis 170, y-axis 172, and z-axis 332. Finally, additional members may be added to the thread milling system 100, various components may be split into other components, and various components may be combined into single components.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of operating a thread milling system, the method comprising:
    securing a product in a securing mount that is mounted to a base assembly of a thread milling machine, the thread milling system comprising the securing mount and the thread milling machine, the thread milling machine having a spindle;
    securing a combination tool to the spindle, the combination tool having a body and an insert, the body having a first end and a second end, the body defining a securing pocket, the insert secured proximate to the second end at a first side of the securing pocket, the second end attached to the spindle;
    securing a threading tool in the combination tool, the threading tool defining a first tool end and a second tool end, the threading tool defining a tool axis extending from the first tool end to the second tool end, the tool axis being coaxial with an axis of rotation of the spindle, the threading tool defining an outer cylindrical surface, a center axis of the outer cylindrical surface being coaxial with the axis of rotation;
    entering dimensions of the product on a control panel;
    determining an x-axis movement along an x-axis, a y-axis movement along a y-axis, and a z-axis movement along a z-axis for the threading tool with the thread milling machine, the x-axis movement, the y-axis movement, and the z-axis movement corresponding to the dimensions;
    rotating the spindle about the axis of rotation;
    engaging the threading tool with the product; and
    cutting threads into the product, cutting threads comprising:
        moving the threading tool with a positioning assembly through at least one pass around the product according to the x-axis movement, the y-axis movement, and the z-axis movement, the thread milling machine comprising the positioning assembly, the positioning assembly comprising an x-axis motor, a y-axis motor, and a z-axis motor, the x-axis motor, the y-axis motor, and the z-axis motor connected in electrical communication with the control panel; and
        disengaging the threading tool from the product after completing the x-axis movement, the y-axis movement, and the z-axis movement; and
    wherein moving the threading tool with a positioning assembly through the at least one pass around the product according to the x-axis movement, the y-axis movement, and the z-axis movement comprises:
        moving a z-axis plate of the positioning assembly relative to a horizontal base plate of the positioning assembly along the z-axis, the horizontal base plate being mounted to the base assembly, the z-axis plate being fixed relative to the horizontal base plate along the x-axis and the y-axis, the z-axis being parallel to the axis of rotation;
        moving an x-axis plate of the positioning assembly relative to the z-axis plate along the x-axis, the x-axis plate being fixed relative to the z-axis plate along the y-axis and the z-axis; and
        moving a y-axis plate of the positioning assembly relative to a vertical base plate of the positioning assembly along the y-axis, the y-axis plate being fixed relative to the vertical base plate along the x-axis and the z-axis, the vertical base plate being secured to the x-axis plate, the vertical base plate being fixed relative to the x-axis plate along the x-axis, the y-axis, and the z-axis, the spindle being mounted to the y-axis plate.

2. The method of claim 1, wherein securing the threading tool in the combination tool comprises inserting the threading tool into the securing pocket.

3. The method of claim 2, wherein securing the threading tool in the combination tool further comprises engaging a fastener to secure the threading tool within the securing pocket.

4. The method of claim 1, wherein rotating the spindle comprises rotating the combination tool.

5. The method of claim 1, wherein the product is a pipe.

6. The method of claim 5, wherein the pipe defines a pipe end, and wherein the method further comprises reaming the pipe end with a reaming insert secured to the combination tool.

7. The method of claim 6, wherein the body defines an insert groove, and wherein the reaming insert is secured within the insert groove.

8. The method of claim 1, wherein:
    cutting threads into the product comprises cutting external threads into an outer surface of the product; and moving the threading tool with the positioning assembly through the at least one pass around the product according to the x-axis movement, the y-axis movement, and the z-axis movement comprises moving the threading tool with the positioning assembly through at least one pass around the outer surface of the product according to the x-axis movement, the y-axis movement, and the z-axis movement.

9. The method of claim 8, wherein the product is a pipe.

10. The method of claim 1, wherein the tool axis is coincidental with the axis of rotation.

11. The method of claim 1, wherein the second tool end is secured in the securing pocket, and wherein the first tool end extends outwards from the threading tool.

12. The method of claim 1, wherein:
the positioning assembly further comprises a y-axis rail and a y-axis slider;
the y-axis rail is secured to the vertical base plate;
the y-axis slider is secured to the y-axis plate;
the y-axis slider slidably engages the y-axis rail; and
the y-axis rail and the y-axis slider are positioned between the y-axis plate and the vertical base plate.

13. The method of claim 12, wherein:
the positioning assembly comprises a y-axis ball-screw assembly;
the y-axis ball-screw assembly comprises a traveler coupled to the y-axis plate and the y-axis motor; and
the y-axis motor is configured to move the traveler along the y-axis ball-screw assembly.

14. The method of claim 1, wherein the spindle is fixed relative to the y-axis plate along the x-axis, the y-axis, and the z-axis.

* * * * *